(12) United States Patent
Toba et al.

(10) Patent No.: US 7,150,502 B2
(45) Date of Patent: Dec. 19, 2006

(54) RECLINING SEAT

(75) Inventors: Eiji Toba, Tochigi (JP); Isao Kawashima, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 374 days.

(21) Appl. No.: 10/648,045

(22) Filed: Aug. 26, 2003

(65) Prior Publication Data

US 2004/0084945 A1 May 6, 2004

(30) Foreign Application Priority Data

Aug. 26, 2002 (JP) ............................. 2002-244857

(51) Int. Cl.
*B60N 2/48* (2006.01)
(52) U.S. Cl. .................. 297/367; 297/654.12
(58) Field of Classification Search ................ 297/367, 297/354.12
See application file for complete search history.

(56) References Cited

U.S. PATENT DOCUMENTS

| 4,103,970 | A | | 8/1978 | Homier |
| 5,090,264 | A | * | 2/1992 | Droulon et al. ............... 74/411 |
| 5,161,856 | A | * | 11/1992 | Nishino ....................... 297/367 |
| 5,681,086 | A | | 10/1997 | Baloche |
| 6,164,723 | A | * | 12/2000 | Ganot .................... 297/378.12 |
| 6,312,053 | B1 | | 11/2001 | Magyar |
| 6,318,805 | B1 | * | 11/2001 | Asano ....................... 297/367 |
| 6,712,429 | B1 | * | 3/2004 | Villarroel .................. 297/361.1 |
| 6,874,670 | B1 | * | 4/2005 | Toba et al. ................. 228/44.3 |
| 6,880,887 | B1 | * | 4/2005 | Hoshihara et al. .......... 297/367 |
| 6,910,737 | B1 | * | 6/2005 | Hosokawa .................. 297/362 |

FOREIGN PATENT DOCUMENTS

| FR | 2578602 | 9/1986 |
| JP | 8253063 | 10/1996 |
| JP | 10127398 | 5/1998 |

* cited by examiner

*Primary Examiner*—Laurie K. Cranmer
(74) *Attorney, Agent, or Firm*—Dann, Dorfman, Herrell and Skillman, P.C.

(57) ABSTRACT

A reclining seat includes a seat cushion, a seat back pivotally mounted to the seat cushion, first and second locking mechanisms arranged at both sides of the seat for securing the seat back relative to the seat cushion, and a supporting shaft interconnecting the first and second locking mechanisms, the supporting shaft having first and second end portions, the first locking mechanism including a first actuating shaft for facilitating selective securing of the seat back relative to the seat cushion, the second locking mechanism including a second actuating shaft for facilitating selective securing of the seat back relative to the seat cushion, the first actuating shaft being rigidly or fixedly connected to the first end portion of the supporting shaft, and the second actuating shaft being connected to the second end portion of the supporting shaft so that the second actuating shaft and the supporting shaft are rotatable by a predetermined angle relative to each other.

24 Claims, 14 Drawing Sheets

RECLINING SEAT

BACKGROUND OF THE INVENTION

1. Field of the Invention

This invention relates to a reclining seat which comprises a seat cushion, a seat back pivotally mounted to the seat cushion, first and second locking means provided at both sides of the seat for securing the seat back relative to the seat cushion, and a supporting shaft interconnecting the first locking means and the second locking means.

2. Description of the Related Art

Each of French Patent No. 2,578,602, Japanese Patent Application Laid-Open No. 8-253063 and U.S. Pat. No. 6,312,053 discloses locking means for securing a seat back relative to a seat cushion. The conventional locking means for securing a seat back relative to a seat cushion comprises a disk-shaped housing, a disk-shaped cover plate, the disk-shaped cover plate having an annular wall and teeth around an inner periphery of the annular wall, the cover plate being rotatably received in the housing in a face to face relation, a plurality of locking gears radially arranged within an inner surface of the housing between the housing and the cover plate, the locking gears each having a toothed surface and being movable between a locked position and an unlocked position, the toothed surfaces of the locking gears being adapted to engage the teeth of the cover plate in the locked position to secure the seat back relative to the seat cushion, a cam for engagement with the locking gears and selectively moving the locking gears between the locked position and the unlocked position, the cam being arranged within the inner surface of the housing between the housing and cover plate and surrounded by the locking gears, a shaft to which the cam is mounted for rotation with the shaft, the shaft extending through the housing and the cover plate, and an operating lever mounted to the shaft for actuating the cam. In the conventional locking means, when a user operates the operating lever, the shaft and the cam are rotated, whereby the locking gears are disengaged from the teeth of the cover plate. In this condition, the seat back is allowed to be reclined relative to the seat cushion.

In a case where the locking means is arranged at only one of both sides of a seat, there is a possibility that the seat back will be unable to be stably secured to the seat cushion. Therefore, if necessary, the locking means is arranged at each of the both sides of the seat. In this case, the operating lever is mounted to only the shaft of one of the first and second locking means. In order that the operating lever can provide rotation to the shaft of the other of the first and second locking means and the cam of the other of the first and second locking means, the shaft of the first locking means and the shaft of the second locking means are coupled to each other through a supporting shaft which is rigidly or fixedly connected at one end portion thereof to the shaft of the first locking means and is rigidly or fixedly connected at the other end portion thereof to the shaft of the second locking means. When the operating lever is operated, the shaft to which the operating lever is mounted is rotated, whereby the corresponding cam is rotated so as to cause the corresponding locking gears to be released from the teeth of the corresponding cover plate. Simultaneously, the rotation of the shaft to which the operating lever is mounted is transmitted to the shaft of the other of the first and second locking means, whereby the corresponding cam is rotated so as to cause the corresponding locking gears to be released from the teeth of the corresponding cover plate. In this condition, the seat back is allowed to be reclined relative to the seat cushion.

In state where the locking gears of the first locking means are released from the teeth of the cover plate of the first locking means, and the locking gears of the second locking means are released from the teeth of the cover plate of the second locking means, when the seat back is rotated relative to the seat cushion in order that the seat back is reclined at a desired angle to the seat cushion and secured relative to the seat cushion in the reclined state, torsion force is applied to the supporting shaft, since both end portions of the supporting shaft are rigidly or fixedly to the shafts of the first and second locking means. Therefore, when the operating lever is released from the user, there is a possibility that the locking gears of one of the first and second locking means can be normally meshed with the teeth of the corresponding cover plate whereas the locking gears of the other of the first second locking means may not be normally meshed with the teeth of the corresponding cover plate. Therefore, reclining angle of the seat back relative to the seat cushion will be unable to be smoothly adjusted and the seat back will be unable to be stably secured relative to the seat cushion.

SUMMARY OF THE INVENTION

The present invention has been made with a view to overcoming the foregoing problem of the prior art seat.

It is an object of this invention to provide a reclining seat in which a seat back can be stably secured relative to a seat cushion.

It is another object of this invention to provide a reclining seat in which reclining angle of a seat back relative to a seat cushion can be smoothly adjusted.

In accordance with the present invention, there is provided a reclining seat. The reclining seat comprises a seat cushion, a seat back pivotally mounted to the seat cushion, first and second locking means arranged at both sides of the seat for securing the seat back relative to the seat cushion, and a supporting shaft interconnecting the first and second locking means, the supporting shaft having first and second end portions, the first locking means including a first actuating shaft for facilitating selective securing of the seat back relative to the seat cushion, the second locking means including a second actuating shaft for facilitating selective securing of the seat back relative to the seat cushion, the first actuating shaft being rigidly or fixedly connected to the first end portion of the supporting shaft, and the second actuating shaft being connected to the second end portion of the supporting shaft so that the second actuating shaft and the supporting shaft are rotatable by a predetermined angle relative to each other.

The supporting shaft is formed into a substantially cylindrical shape. The second end portion of the supporting shaft is formed into a substantially elliptical shape in cross-section and comprise a pair of flat wall sections spaced apart from each other, and a pair of circular arc-shaped wall sections spaced apart from each other and interconnecting the flat wall sections. The second actuating shaft has first and second end portions, the first end portion of the second actuating shaft having an axial portion and a pair of flange portions which are spaced apart from each other and protruding radially from the axial portion. The flanged end portion of the second actuating shaft is received in the second end portion of the supporting shaft.

The first end portion of the second actuating shaft may have a round bar-shaped body. The spaced apart flange portions project radially from the round bar-shaped body. The first end portion of the second actuating shaft is received in the second end portion of the supporting shaft so that the round bar-shaped body and the spaced apart flat wall sections of the supporting shaft are slide slid relative to each other and the flange portions and the spaced apart circular arc-shaped wall sections are slid relative to each other, when one of the supporting shaft and the second actuating shaft is rotated relative to the other of the supporting shaft and the second actuating shaft.

The second end portion of the supporting shaft further includes corner portions between the flat wall sections and the circular arc-shaped wall sections. The flange portions of the second actuating shaft and the corner portions of the supporting shaft are adapted to be engaged with each other when one of the supporting shaft and the second actuating shaft is rotated relative to the other of the supporting shaft and the second actuating shaft.

The first locking means may comprise a first disk-shaped housing mounted to a seat cushion frame for the seat cushion, a first disk-shaped cover plate received in the first housing in a face to face relation so as to be rotatable relative to the first housing, and mounted to a seat back frame for the seat back, first locking gear means arranged within an inner surface of the first housing between the first housing and the first cover plate, the first locking gear means being movable between a first locked position and a first unlocked position, first cooperating means on the first disk-shaped cover plate and the first locking gear means for securing the seat back relative to the seat cushion in the first locked position and a first cam for causing the first locking gear means to be moved between the first locked position and the first unlocked position. The first cam is mounted to the first actuating shaft for rotation therewith. The first cam is arranged within the first housing with the first actuating shaft of the first cam extending through the first housing and the first cover plate. The second locking means may comprise a second disk-shaped housing mounted to the seat cushion frame for the seat cushion, a second disk-shaped cover plate received in the second housing in a face to face relation so as to be rotatable relative to the second housing, and mounted to the seat back frame for the seat back, second locking gear means arranged within an inner surface of the second housing between the second housing and the second cover plate, the second locking gear means being movable between a second locked position and a second unlocked position, second cooperating means on the second disk-shaped cover plate and the second locking gear means for securing the seat back relative to the seat cushion in the second locked position, and a second cam for causing the second locking gear means to be moved between the second locked position and the second unlocked position, second cam being mounted to the second actuating shaft for rotation therewith, and the second cam being arranged within the second housing with the second actuating shaft of the second cam extending through the second housing and the second cover plate.

The first locking gear means comprises a plurality of first locking gears. The first cooperating means comprises a circumferentially toothed surface formed around an inner periphery of the first cover plate and a toothed surface formed on each of the first locking gears, the first locking gears being radially arranged within the first housing and surrounding the first cam. The second locking gear means comprises a plurality of second locking gears. The second cooperating means comprises a circumferentially toothed surface formed around an inner periphery of the second first cover plate and a toothed surface formed on each of the second locking gears, the second locking gears being radially arranged within the second housing and surrounding the second cam.

The first actuating shaft has first and second end portions. The first end portion of the first actuating shaft is rigidly or fixedly connected to the first end portion of the supporting shaft. An operating lever is mounted to the second end portion of the first actuating shaft.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals designate the same parts throughout the Figures and wherein.

DETAILED DESCRIPTION OF THE PREFERRED EMBODIMENTS

A reclining seat according to the present invention will be discussed hereinafter with reference to the accompany drawings.

Figure 1:
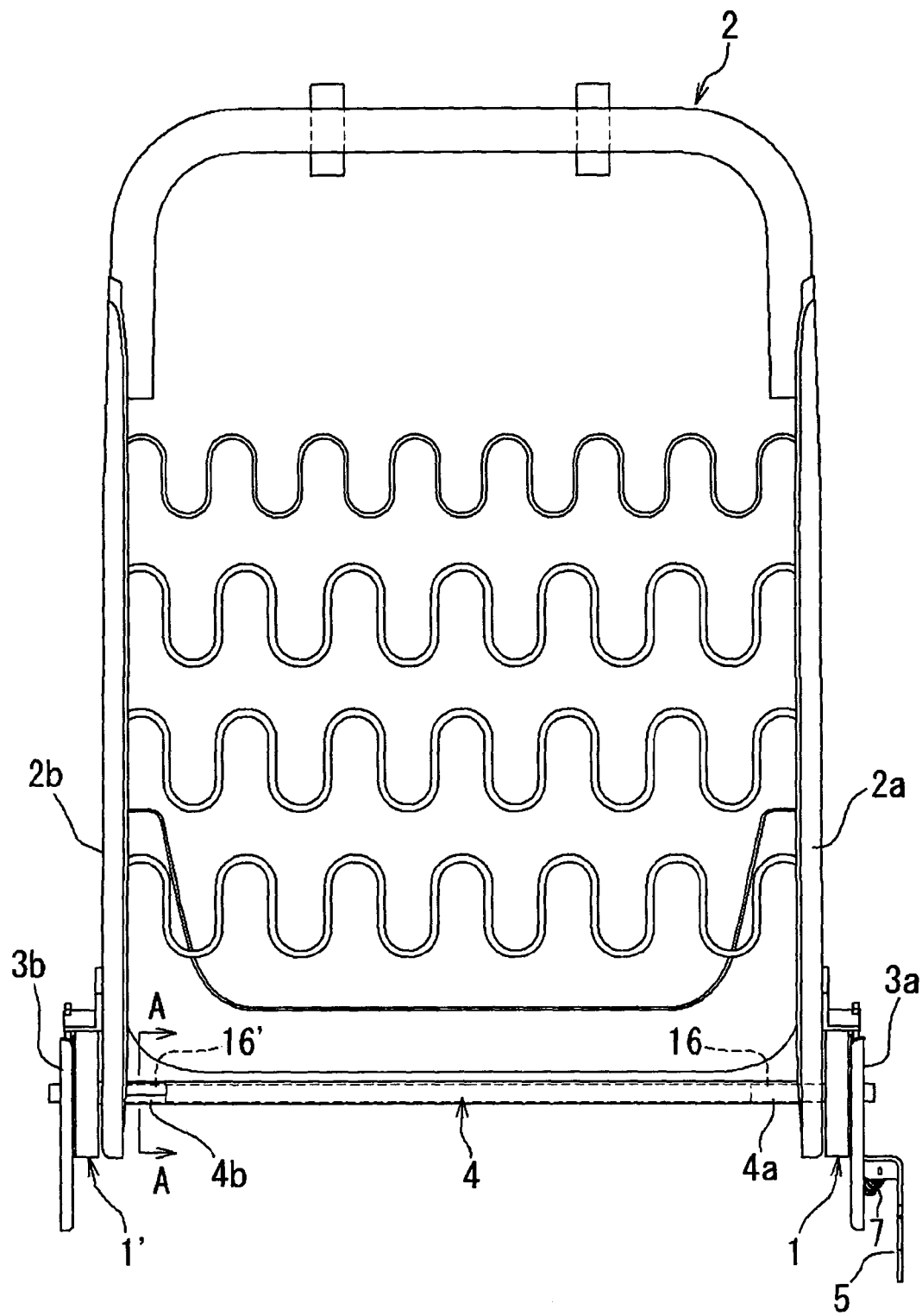
FIG. 1 is a schematic front view of a seat back frame for a seat back of a reclining seat according to the present invention.

Referring to FIG. 1, there is illustrated a seat back frame 2 of a reclining assistant seat for a motor vehicle according to the present invention. The reclining seat is to be employed in a motor vehicle which is provided with a steering wheel at the right side. The present invention may be applied to a seat for a motor vehicle which is provided with a steering wheel at the left side.

The reclining seat generally includes an unshown seat cushion, an unshown seat back pivotally mounted to the seat cushion, and first and second locking means 1, 1'0 provided at both sides of the seat for securing the seat back relative to the seat cushion. The seat back includes the seat back frame 2 which has first and second side frame portions 2a, 2b. The seat cushion includes an unshown seat cushion frame which has first and second side brackets 3a, 3b. The first locking means 1 is arranged between the first side frame portion 2a of the seat back frame 2 and the first side bracket 3a of the seat cushion frame in a sandwiched relationship. Similarly, the second locking means 1' is arranged between the second side frame portion 2b of the seat back frame 2 and the second side bracket 3b of the seat cushion frame in a sandwiched relationship. The first side frame portion 2a of the seat back frame 2 is pivotally mounted to the first side bracket 3a of the seat cushion frame by an actuating shaft 16 of the first locking means 1, and the second frame portion 2b of the seat back frame 2 is pivotally mounted to the second side bracket 3b of the seat cushion frame by an actuating shaft 16' of the second locking means 1', whereby the seat back can be reclined relative to the seat cushion. The actuating shafts 16, 16' of the first and second locking means 1, 1' are coupled to each other through a supporting shaft 4 of a substantially cylindrical shape which has first and second end portions 4a, 4b. An operating lever 5 for actuating the first and second locking means 1, 1' is mounted on the actuating shaft 16 of the first locking means 1. When the operating lever 5 is operated by a passenger, the first and second locking means 1, 1' are actuated so as to allow movement of the seat back relative to the seat cushion as will be discussed in greater detail hereinafter.

Figure 2:
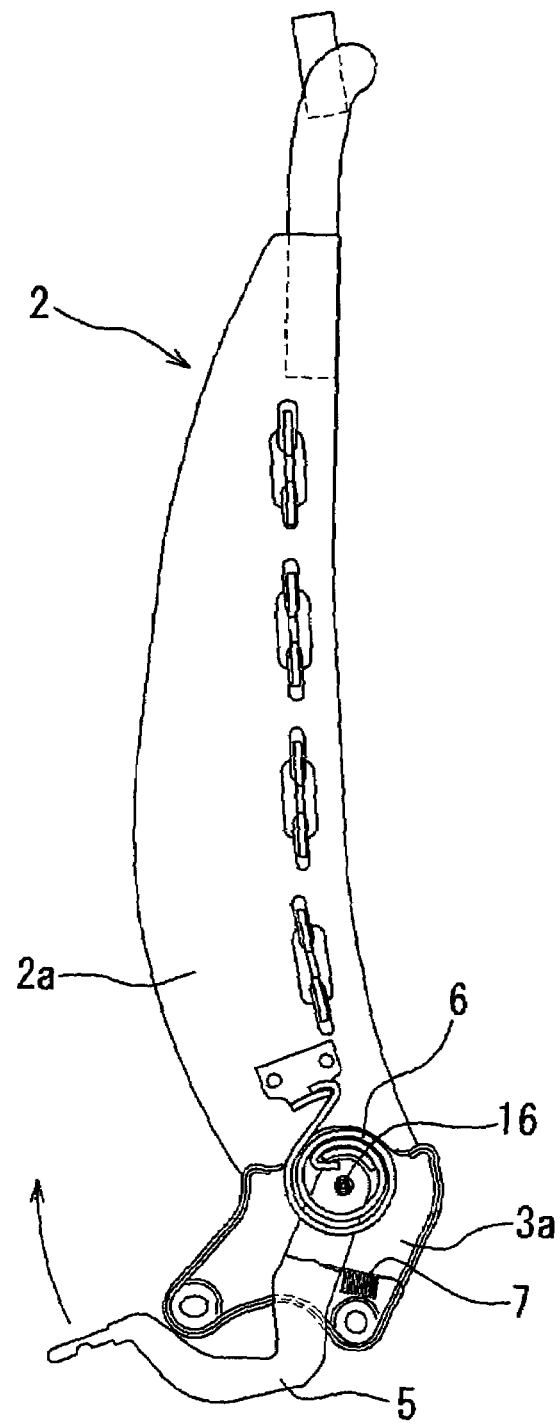
FIG. 2 is a schematic side view of the seat back frame of FIG. 1.

Referring to FIG. 2, a spiral spring 6 is stretched between the first side frame portion 2a and the first side bracket 3a. Similarly, a spiral spring is stretched between the second side frame portion and the second side bracket (not shown). Further, a coil spring 7 is stretched between the first side bracket 3a and the operating lever 5.

Figure 3:
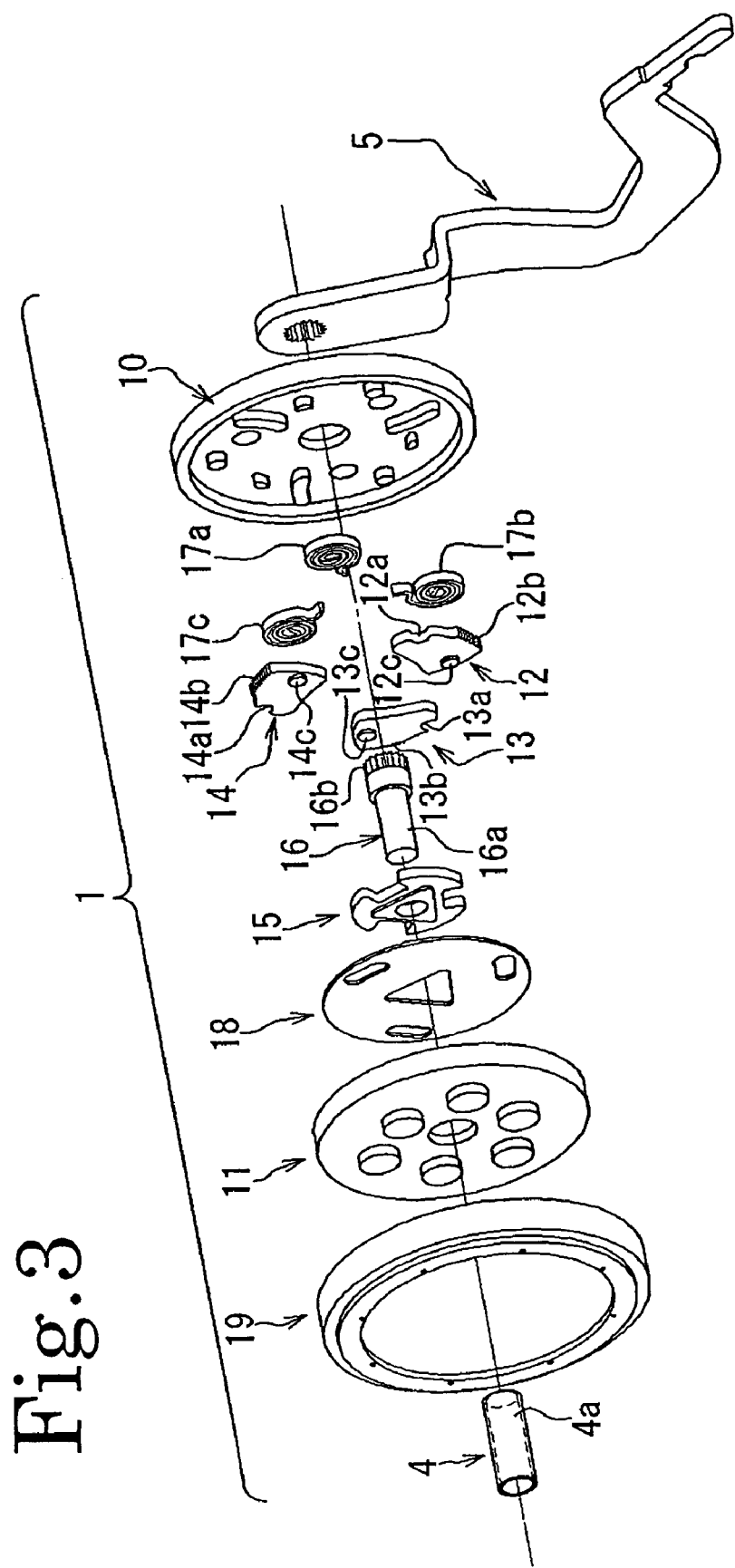
FIG. 3 is a schematic exploded perspective view of first locking means arranged at one of both sides of the reclining seat according to the present invention.

Referring to FIG. 3, the first locking means 1 comprises a substantially disk-shaped housing 10, a substantially disk-shaped cover plate 11, three locking gears 12, 13, 14, the actuating shaft 16, a cam 15 for causing the locking gears 12, 13, 14 to be displaced, the cam 15 being mounted to the actuating shaft 16 for rotation therewith, three spiral springs 17a, 17b, 17c, a guide plate 18 for inducting the locking gears 12, 13, 14, and a ring-shaped cover 19 for causing the housing 10 and the cover plate 11 to be combined with each other.

The first locking gear 12 is formed into a substantially square shape and has a semicircular notch 12a formed in a first region of a periphery thereof, a toothed portion 12b formed at a second region of the periphery thereof, and an induction pin 12c projecting up from a general surface of the locking gear 12. Similarly, the second locking gear 13 is formed into a substantially square shape and has a semicircular notch 13a formed in a first region of a periphery thereof, a toothed portion 13b formed at a second region of the periphery thereof, and an induction pin 13c projecting up from a general surface of the locking gear 13. Also, the third locking gear 14 is formed into a substantially square shape and has a semicircular notch 14a formed in a first region of a periphery thereof, a toothed portion 14b formed at a second region of the periphery thereof, and an induction pin 14c projecting up from a general surface of the locking gear 14. The first, second and third locking gears 12, 13, 14, the cam 15, and the spiral springs 17a, 17b, 17c are arranged within the housing 10 as will be discussed in greater detail hereinafter.

Figure 4:
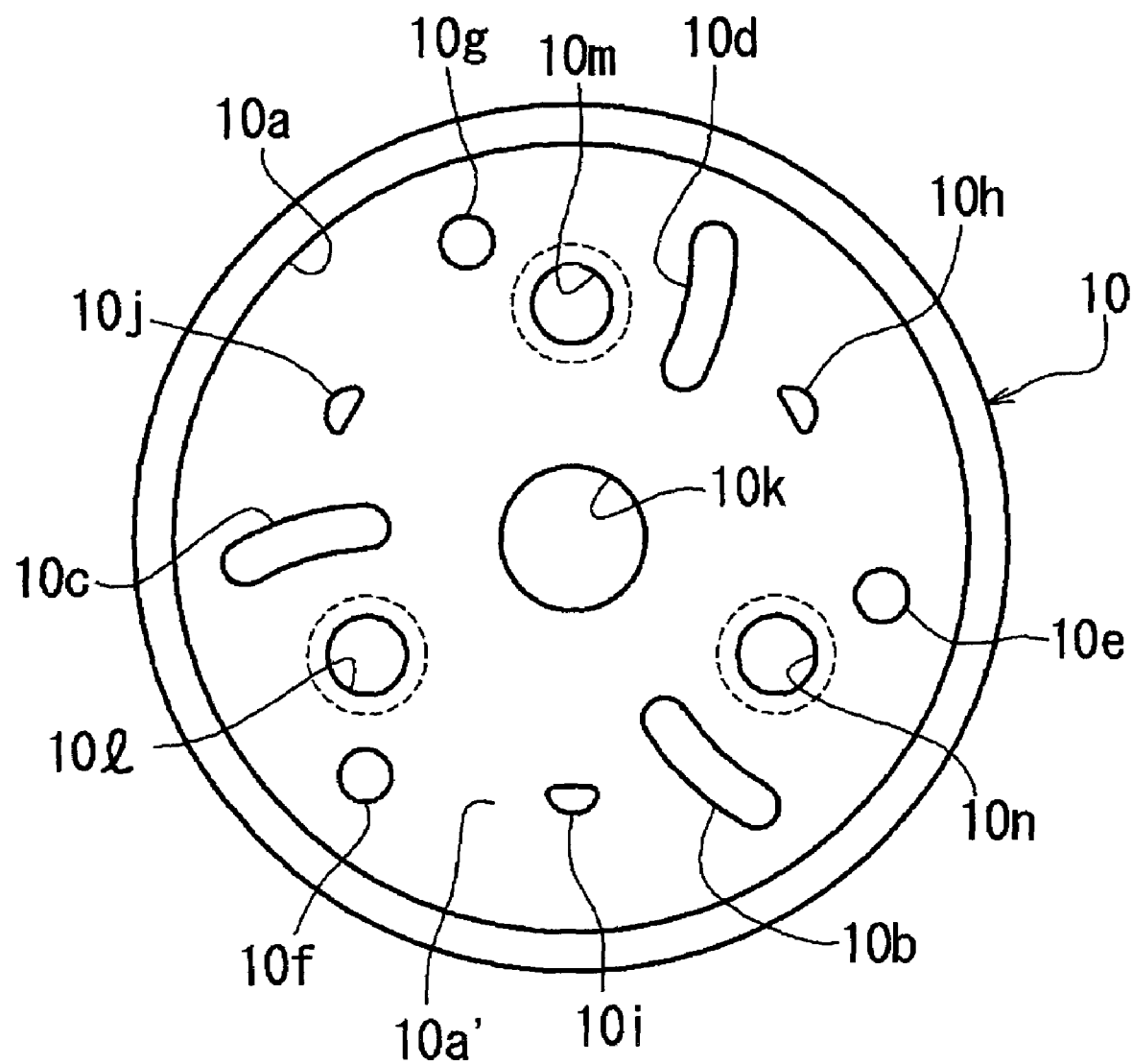
FIG. 4 is a schematic side view of a housing of the first locking means of FIG. 3.

Referring to FIG. 4, the housing 10 comprises a circular plate portion 10a', an annular wall 10a standing up from a circular edge of the circular plate portion 10a', spaced apart guide blocks 10b, 10c, 10d protruding from an inner surface of the circular plate portion 10a', first spaced apart supporting pins 10e, 10f, 10g protruding from the inner surface of the circular plate portion 10a', second spaced apart supporting pins 10h, 10i, 10j protruding from the inner surface of the circular plate portion 10a', a through-hole 10k formed in a central region of the circular plate portion 10a' for receiving the actuating shaft 16 of the cam 15, and spaced apart protrusions 10l, 10m, 10n protruding from an outer surface of the plate portion 10a'. The housing 10 is mounted to the first side bracket 3a of the seat cushion frame by welding the protrusions 10l, 10m, 10n of the housing 10 to the first side bracket 3a of the seat cushion frame.

Figure 5:
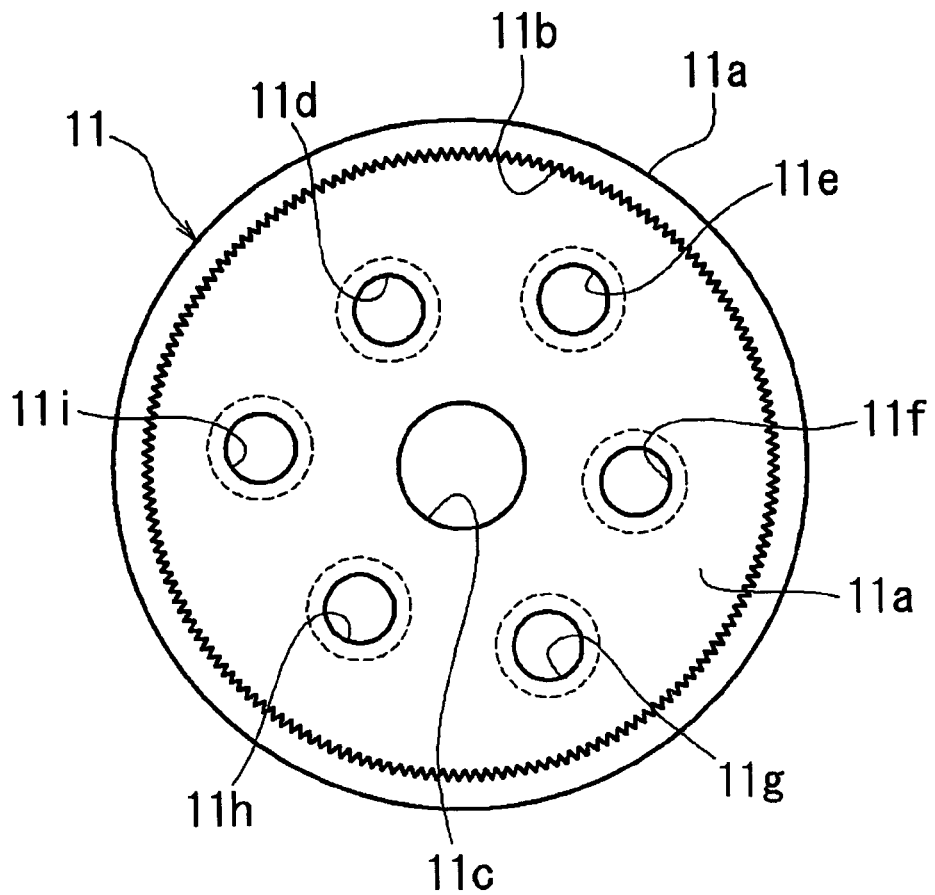
FIG. 5 is a schematic side view of a cover plate of the first locking means of FIG. 3.

Referring to FIG. 5, the cover plate 11 comprises a circular plate portion 11a', an annular wall 11a standing up from a circular edge of the circular plate portion 11a' and having a circumferentially toothed surface 11b around an inner periphery of the annular wall 11a, a through-hole 11c formed in a central region of the circular plate portion 11a' for receiving the actuating shaft 16 of the cam 15, and spaced apart protrusions 11d, 11e, 11f, 11g, 11h, 11i protruding from an outer surface of the circular plate portion 11a'. The outer diameter of the annular wall 11a of the cover plate 11 is smaller than the inner diameter of the annular wall 10a of the housing 10. The cover plate 11 is received in the housing 10 in a face to face relation so as to be rotatable independently from the actuating shaft 16 and the housing 10. The cover plate 11 is mounted through the ring-shaped cover 19 to the first side frame portion 2a of the seat back frame 2 by welding the protrusions 11d, 11e, 11f, 11g, 11h, 11i of the cover plate 11 to the first side frame portion 2a of the seat back frame 2.

Figure 6:
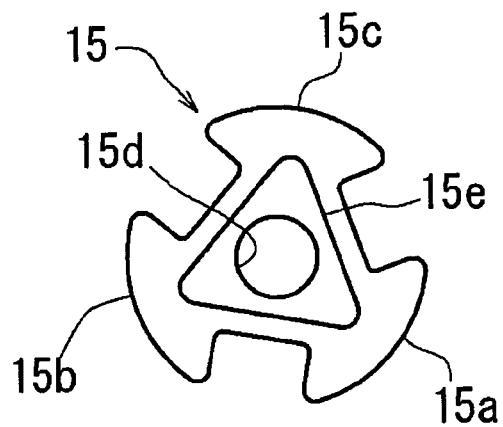
FIG. 6 is a schematic side view of a cam of the first locking means of FIG. 3.

Referring to FIG. 6, the cam 15 is formed into a substantially plate-shape and comprises three radially protruding jaws 15a, 15b, 15c for pushing the locking gears 12, 13, 14, each of the protruding jaws 15a, 15b, 15c having a curved surface, a substantially triangular boss portion 15e, and a through-hole 15d formed in the triangular boss portion 15e for receiving the actuating shaft 16. As described above, the cam 15 is mounted to the actuating shaft 16 for rotation therewith.

Figure 7:
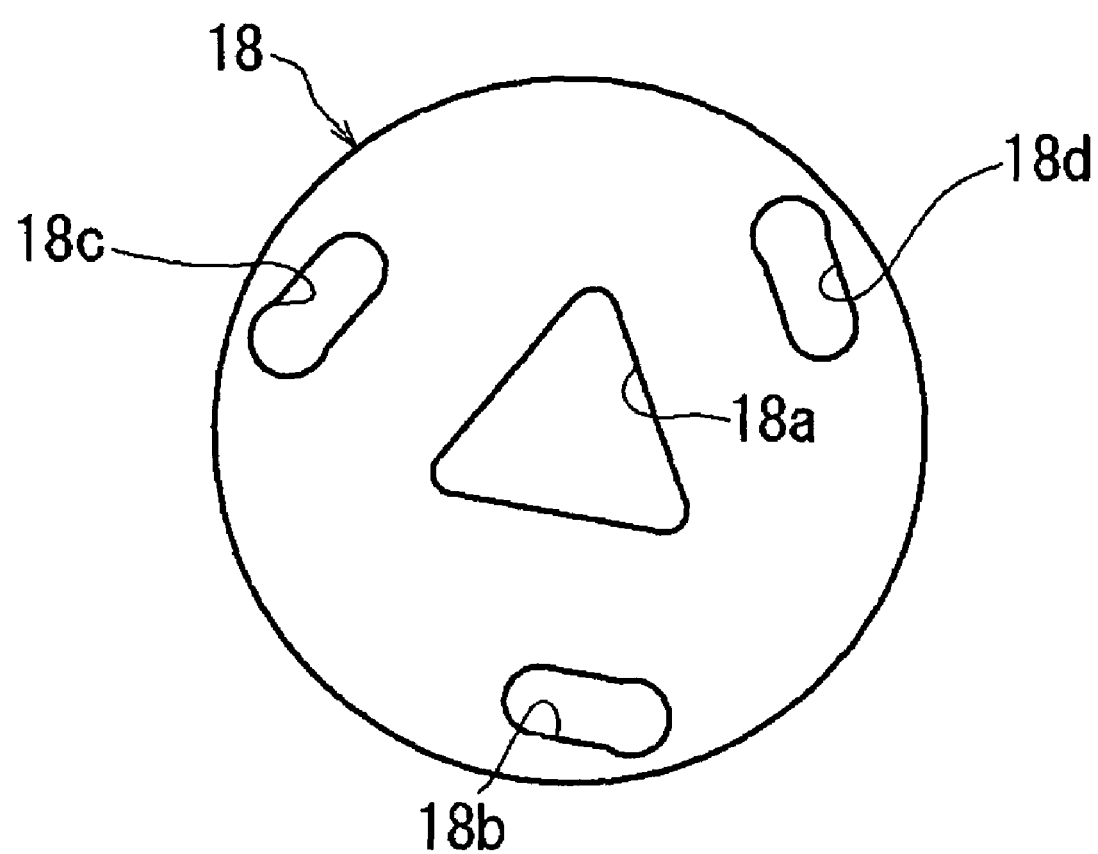
FIG. 7 is a schematic side view of a guide plate of the first locking means of FIG. 3.

Referring to FIG. 7, the guide plate 18 is formed into a substantially circular plate-shape and has a diameter smaller than an inner diameter of the annular wall 11a of the cover plate 11. The guide plate 18 has a substantially triangular through-hole 18a formed in a central portion thereof for receiving the boss portion 15e of the cam 15, and spaced apart elongated guide holes 18b, 18c, 18d for receiving the induction pins 12c, 13c, 14c of the locking gears 12, 13, 14. Each of the elongated guide holes 18b–18d is formed in a region of the guide plate 18 which is adjacent a periphery of the guide plate 15. The guide plate 15 is mounted to the cam 15 for rotation therewith, by causing the substantially triangular boss portion 15e of the cam 15 to be fitted in the substantially triangular through-hole 18a of the guide plate 18.

Again referring to FIG. 3, the actuating shaft 16 of the cam 15 comprises a round bar-shaped body which has a first end portion 16a and a second grooved end portion 16b. The actuating shaft 16 extends through the through-hole 10k of the housing 10, the through-hole 11c of the cover plate 11, and the ring-shaped cover 19. The first end portion 16a of the actuating shaft 16 penetrates the first side frame portion 2a (FIG. 1) of the seat back frame 2 and is rigidly or fixedly fitted in the first end portion 4a of the supporting shaft 4 for rotation therewith. The second end portion 16b of the actuating shaft 16 penetrates the first side bracket 3a of the seat cushion frame. The operating lever 5 is mounted to the second grooved end portion 16b of the actuating shaft 16 which projects from the first side bracket 3a of the seat cushion frame, by causing the second grooved end portion 16b of the actuating shaft 16 to be fitted in a grooved hole 5a of the operating lever 5 which is formed in a base portion of the operating lever 5.

Figure 8:
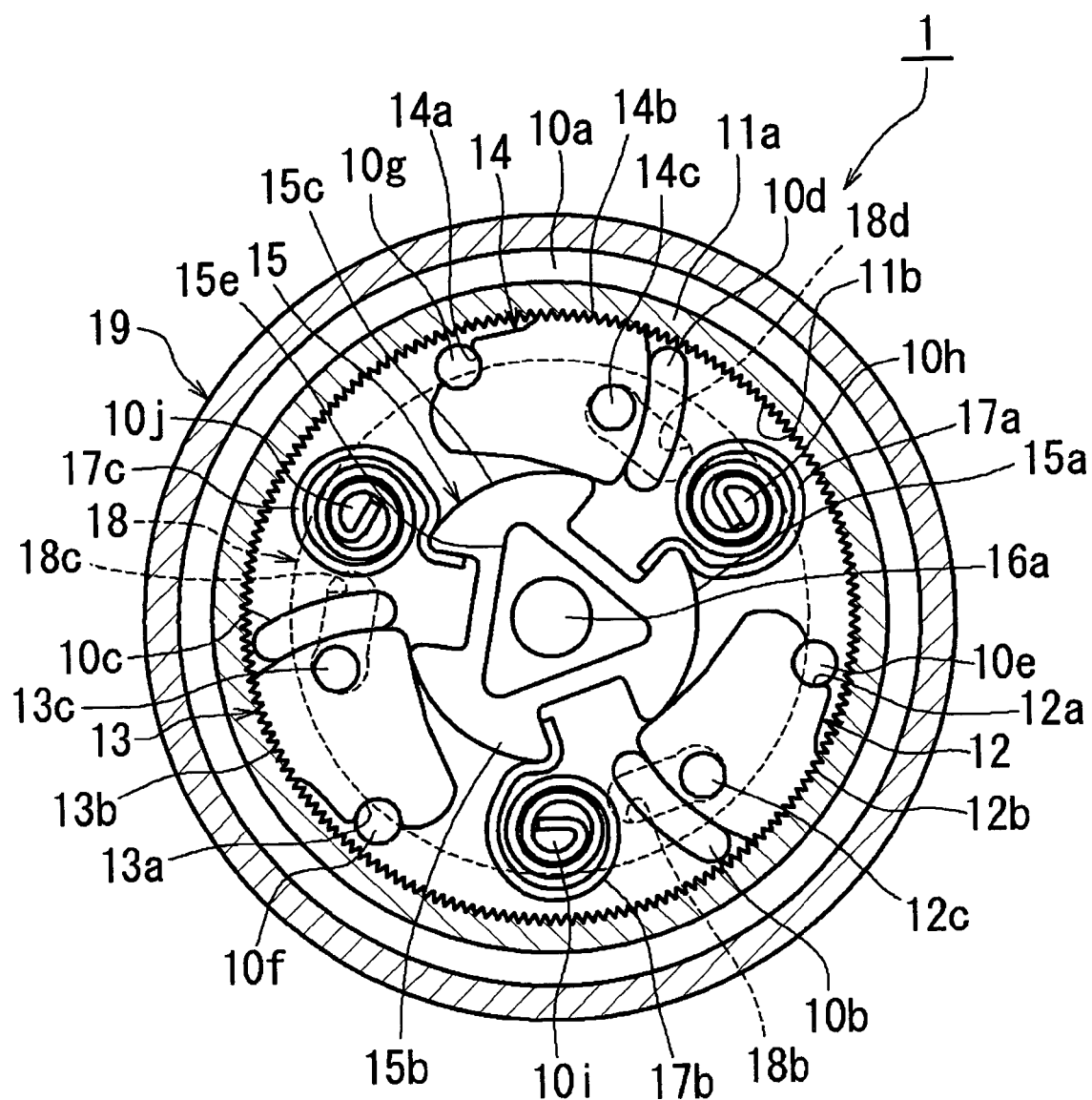
FIG. 8 is a schematic side view of the first locking means of FIG. 3 and of assistance in explaining a state where locking gears of the first locking means are meshed with a circumferentially toothed surface of the cover plate of FIG. 5.

Referring to FIG. 8, the cam 15 mounted to the actuating shaft 16 is arranged on the circular plate portion 10a' (FIG. 4) of the housing 10 with the second grooved end portion 16b (FIG. 3) of the actuating shaft 16 penetrating the through-hole 10k (FIG. 4) of the housing 10, and the first side bracket 3a of the seat cushion frame (FIG. 1). As discussed above, the operating lever 5 is mounted to the second grooved end portion 16b of the actuating shaft 16 which is projected from the first side bracket 3a of the seat cushion frame.

The locking gears 12, 13, 14 are radially arranged on the circular plate portion 10a' (FIG. 4) of the housing 10 and surround the cam 15. More particularly, the first locking gear 12 is movably arranged on the circular plate portion 10a' of the housing 10 and positioned between the guide block 10b of the housing 10 and the supporting pin 10e of the housing 10 with a portion thereof slidably contacting the guide block 10b and with the notch 12a thereof being engaged with the supporting pin 10e of the housing 10, so that the first locking gear 12 can be turned around the supporting pin 10e while being guided by the guide block 10b. Similarly, the second locking gear 13 is movably arranged on the circular plate portion 10a' of the housing 10 and positioned between the guide block 10c of the housing 10 and the supporting pin 10f of the housing 10 with a portion thereof salidably contacting the guide block 10c and with the notch 13a thereof being engaged with the supporting pin 10f of the housing 10, so that the second locking gear 13 can be turned around the supporting pin 10f while being guided by the guide block 10c. Also, the third locking gear 14 is movably arranged on the circular plate portion 10a' of the housing 10 and positioned between the guide block 10d of the housing 10 and the supporting pin 10g of the housing 10 with a portion thereof slidably contacting the guide block 10d and with the notch 14a thereof being engaged with the supporting pin 10g of the housing 10, so that the third locking gear 14 can be turned around the supporting pin 10g while being guided by the guide block 10d.

The first spiral spring 17a is arranged on the circular plate portion 10a' (FIG. 4) of the housing 10 with an innermost end thereof being engaged with the supporting pin 10h of the housing 10 and with an outermost end thereof being engaged with the protruding jaw 15a of the cam 15. Similarly, the second spiral spring 17b is arranged on the circular plate portion 10a' of the housing 10 with an innermost end thereof being engaged with the supporting pin 10i of the housing 10 and with an outermost end thereof being engaged with the protruding jaw 15b of the cam 15. Also, the third spiral spring 17c is arranged on the circular plate portion 10a' of the housing 10 with an innermost end thereof being engaged with the supporting pin 10j of the housing 10 and with an outermost end thereof being engaged with the protruding jaw 15c of the cam 15. As discussed above, the cover plate 11 is received in the housing 10. The cam 15 is always urged by the spiral springs 17a, 17b, 17b so as to push the locking gears 12, 13, 14 at the protruding jaws 15a, 15b, 15c thereof, whereby the toothed portions 12b, 13b, 14b of the locking gears 12, 13, 14 are always meshed with the toothed surface 11b of the cover plate 11.

The guide plate 18 is mounted to the cam 15 for rotation therewith, with the triangular through-hole 18a thereof receiving the triangular boss portion 15e of the cam 15 and with the guide holes 18b, 18c, 18d thereof receiving the induction pins 12c, 13c, 14c of the locking gears 12, 13, 14, respectively.

Figure 9:
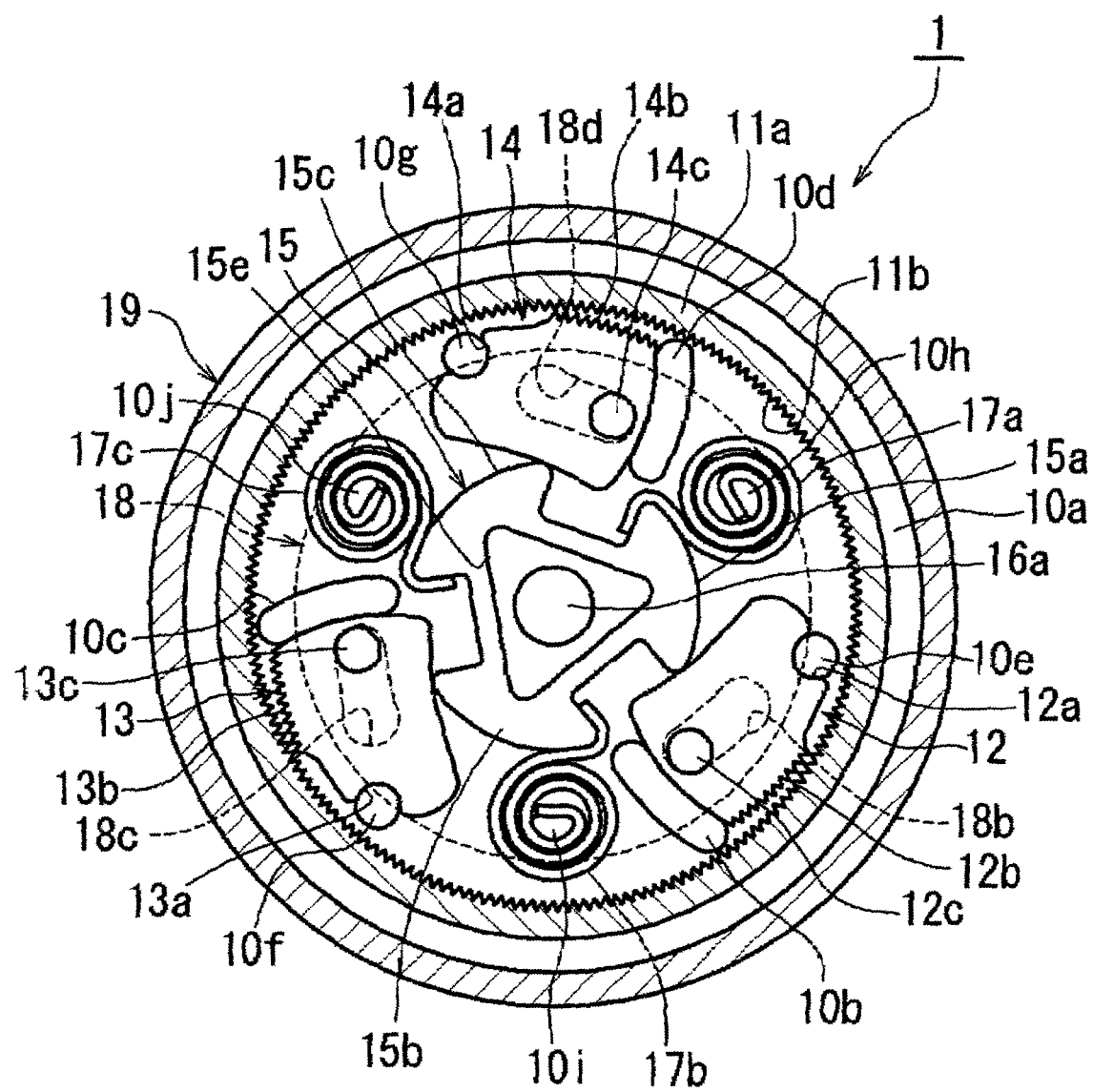
FIG. 9 is a schematic side view of the first locking means of FIG. 3 and of assistance in explaining a condition where the locking gears of the first locking means are released from the circumferentially toothed surface of the cover plate of FIG. 5.

When the cam 15 is turned in a counterclockwise direction (in FIG. 8) against the actions of the spiral springs 17a, 17b, 17c by operating the operating lever 5 (FIGS. 1–3) and the guide plate 18 is turned together with the cam 15, the guide holes 18b, 18c, 18d of the guide plate 18 are moved relative to the induction pins 12c, 13c, 14c of the locking gears 12, 13, 14. As the guide holes 18b, 18c, 18d of the guide plate 18 are moved relative to the induction pins 12c, 13c, 14c of the locking gears 12, 13, 14, the locking gears 12, 13, 14 are turned around the supporting pins 10e, 10f, 10g of the housing 10 and displaced so as to be disengaged from the circumferential toothed surface 11b of the cover plate 11 as shown in FIG. 9.

The cover plate 11 is arranged in a face to face relation with respect to the housing 10 so as to be rotatable independently from the housing 10, with the through-hole 11c thereof receiving the first end portion 16a of the actuating shaft 16 of the cam 15 and with the annular wall 11a thereof being received in the annular wall 10a of the housing 10.

The ring-shaped cover 19 is mounted on an outside of the housing 10 so as to allow the cover plate 11 to be rotatable independently from the housing 10.

Figure 10:
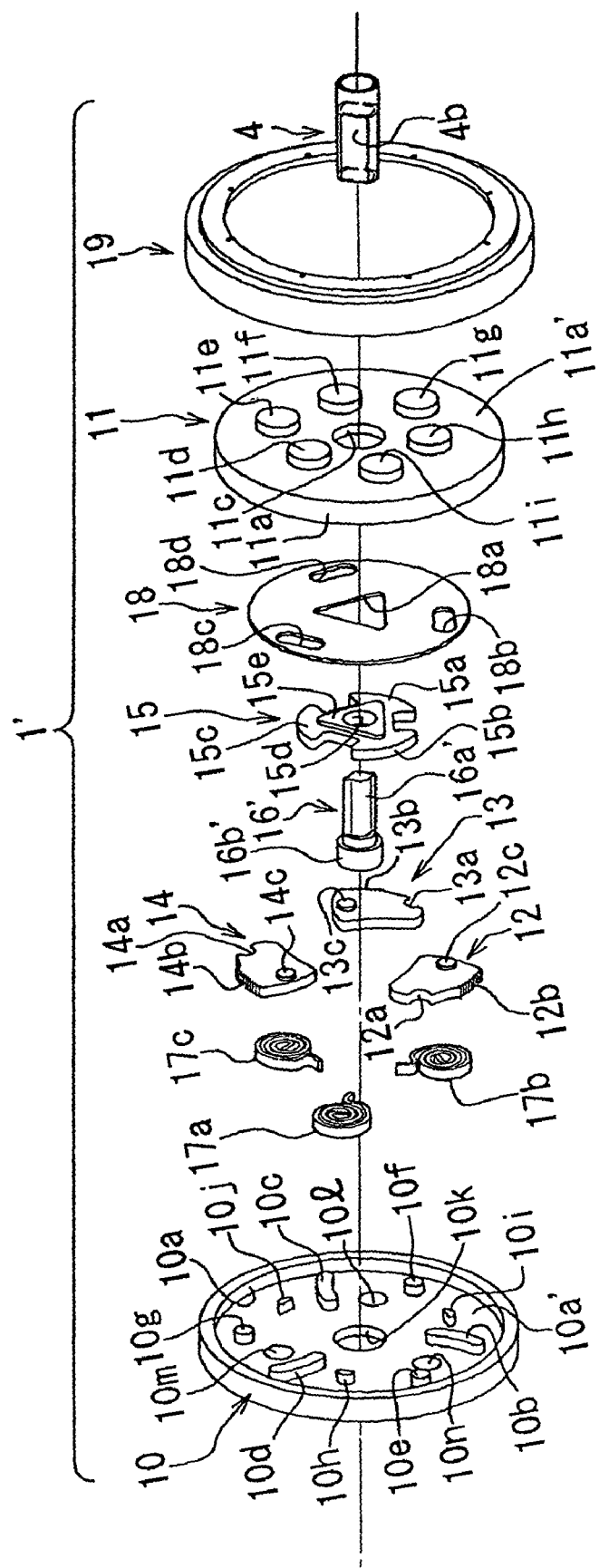
FIG. 10 is a schematic exploded perspective view of second locking means arranged at the other of the both sides of the reclining seat according to the present invention.

Referring to FIG. 10, there is illustrated the second locking means 1'. The second locking means 1' is generally similar to the first locking means 1 except that the different actuating shaft 16' is employed. In FIG. 10, components of the second locking means 1' which are identical or similar to those of the first locking means 1 are denoted by same reference numerals. Therefore, the description of them will not be repeated.

The second locking means 1' comprises a substantially disk-shaped housing 10, a substantially disk-shaped cover plate 11, three locking gears 12, 13, 14, the actuating shaft 16', a cam 15 for causing the locking gears 12, 13, 14 to be displaced, the cam 15 being mounted to the actuating shaft 16' for rotation therewith, three spiral springs 17a, 17b, 17c, a guide plate 18 for inducting the locking gears 12, 13, 14, and a ring-shaped cover 19 for causing the housing 10 and the cover plate 11 to be combined with each other. In the second locking means 1', the components of the locking means 1' are arranged in an order reverse to the arranging order of the components of the first locking means 1 which is illustrated in FIG. 3.

In the second locking means 1', the locking gears 12–14, the cam 15, and the spiral springs 17a–17c are arranged within the housing 10 in the same manner as those of the first locking means 1 are done within the housing 10 of the first locking means 1. Similarly, the guide plate 18 of the second locking means 1' is mounted to the cam 15 for rotation therewith. More particularly, the guide plate 18 is mounted to the cam 15 for rotation therewith, with a triangular through-hole 18a thereof receiving a triangular boss portion 15e of the cam 15 and with guide holes 18b, 18c, 18d thereof receiving induction pins 12c, 13c, 14c of the locking gears 12, 13, 14, respectively. The second locking means 1' is actuated in the same manner as the first locking means 1 is done.

Figure 11:
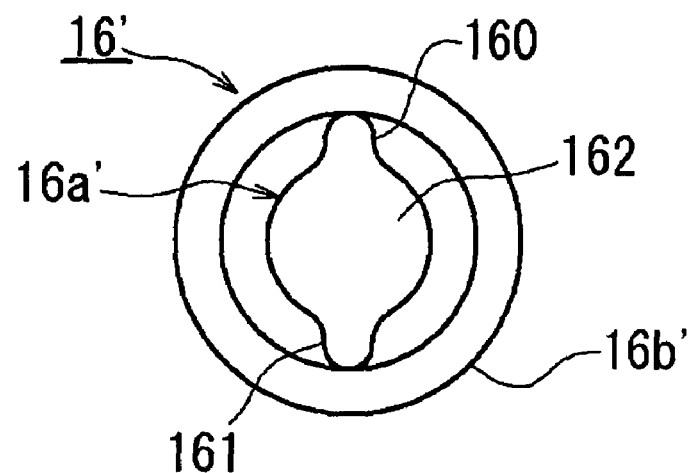
FIG. 11 is a schematic end view of a first end portion of an actuating shaft of the second locking means shown in FIG. 10.

Again referring to FIG. 10 and referring to FIG. 11, the actuating shaft 16' of the second locking means 1' comprises a round bar-shaped body which has a small diameter portion 16a', a large diameter portion 16b', and a pair of flange portions 160, 161 protruding radially from an axial portion 162 of the small diameter portion 16a' so as to protrude in the direction opposite to each other and extending along the axial portion 162 of the small diameter portion 16a'. The large diameter portion 16b' of the actuating shaft 16' penetrates a through-hole 10k of the housing 10 and the second side bracket 3b (FIG. 1) of the seat cushion frame to which the housing 10 is mounted by welding. The small diameter portion 16a' of the actuating shaft 16' penetrates a through-hole 15d of the cam 15, a through-hole 11c of the cover plate 11, the ring-shared cover 19 and the second side frame portion 2b of the seat back frame 2 (FIG. 1) to which the cover plate 11 is mounted through the ring-shaped cover 19 by welding, and is rotatably connected to the second end portion 4b of the supporting shaft 4.

Figure 12:
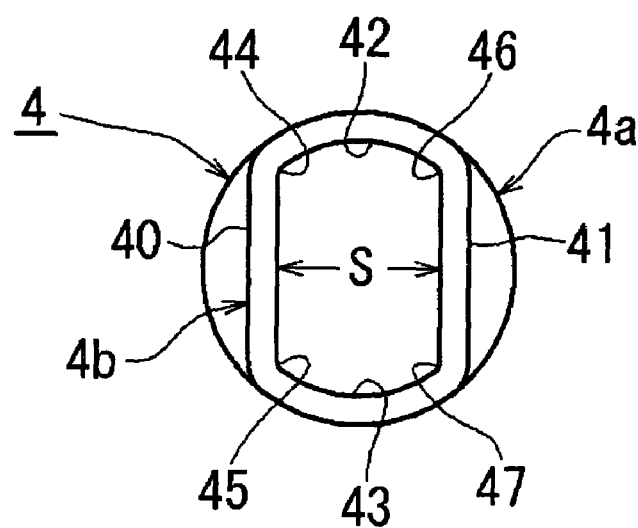
FIG. 12 is a schematic end view of a second end portion of a supporting shaft of the reclining seat according to the present invention.

Referring to FIG. 12, the second end portion 4b of the supporting shaft 4 is formed into a substantially elliptical shape in cross-section and comprises a pair of flat wall sections 40, 41 which are opposite to each other and spaced apart from each other at an interval S, and a pair of spaced apart circular arc-shaped wall sections 42, 43 interconnecting the flat wall sections 40, 41. There are provided corners 44, 46 between the flat wall sections 40, 41 and the circular arc-shaped wall section 42, and corners 45, 47 between the flat wall sections 40, 41 and the circular arc-shaped wall section 43.

Figure 13:
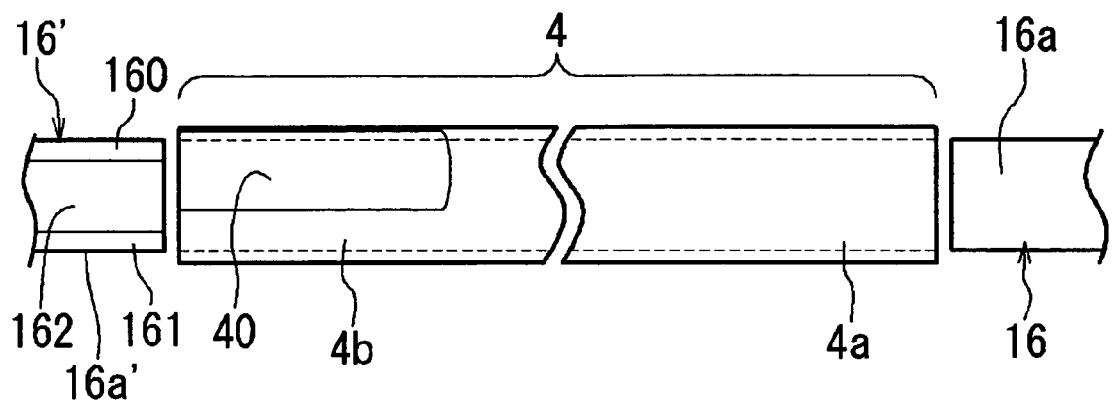
FIG. 13 is a schematic view of a connection construction for connecting a supporting shaft and an actuating shaft of the first locking means and the actuating shaft of the second locking means.

Referring to FIG. 13, the actuating shaft 16 of the first locking means 1 is rigidly or fixedly connected to the first end portion 4a of the supporting shaft 4 by causing the first end portion 16a of the actuating shaft 16 to be fitted in the first end portion 4a of the supporting shaft 4 and welding the first end portion 16a of the first actuating shaft 4 and the first end portion 4a of the supporting shaft 4 together. The flanged end portions 16a' of the actuating shaft 16' is received in the second end portion 4b of the supporting shaft 4 so that the second actuating shaft 16' and the supporting shaft 4 are allowed to be rotated at an angle to each other. Taking into a consideration a correlation between the shape of the second end portion 4b of the supporting shaft 4 and the shape of the first end portion 16a' of the second actuating shaft 16', the rotation angle is preferably set to an angle of about 7–9 degrees.

Figure 14:
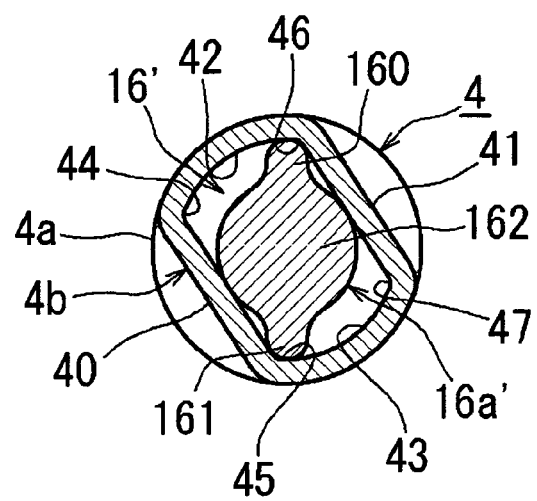
FIG. 14 is a schematic cross-sectional view of the supporting shaft and the actuating shaft of the second locking means, taken on a plane indicated in FIG. 1 by a line A—A.

Referring to FIG. 14, there is illustrated the supporting shaft 4 and the actuating shaft 16 received in the supporting shaft 4. When a rotational torque is transmitted to the supporting shaft 4, the supporting shaft 4 is rotated relative to the actuating shaft 16' of the second locking means 1'. During the rotational movement of the supporting shaft 4 relative to the actuating shaft 16', the flat surface wall sections 40, 41 of the supporting shaft 4 are slid on the axial portion 162 of the actuating shaft 16' and the spaced apart circular arc-shaped wall sections 42, 43 are slid on the flange portions 160, 161 of the actuating shaft 16', so that the supporting shaft 4 can be steadily rotated relative to the actuating shaft 16'. In the state shown in FIG. 14 wherein the corners 45, 46 of the supporting shaft 4 are engaged with the flange portions 160, 161 of the actuating shaft 16' by the rotation of the supporting shaft 4 relative to the actuating shaft 16', the rotational torque applied to the supporting shaft 4 is transmitted to the actuating shaft 16', whereby the actuating shaft 16' is rotated so as to cause the second locking means 1' to be actuated in the same manner as the first locking means 1 is done.

Again referring to FIGS. 8 and 9, the operation of the first and second locking means 1, 1' will be discussed in greater detail hereinafter.

When the operating lever 5 (FIGS. 1–3) is operated by the passenger, whereby the actuating shaft 16 of the first locking means 1 is rotated together with the supporting shaft 4, the cam 15 mounted to the actuating shaft 16 is rotated in the counterclockwise direction against the actions of the spiral springs 17a, 17b, 17c of the first locking means 1 and the guide plate 18 of the first locking means 1 is rotated together with the cam 15 of the actuating shaft 16. At this time, the guide holes 18b, 18c, 18d of the guide plate 18 of the first locking means 1 are moved relative to the induction pins 12c, 13c, 14c of the locking gears 12, 13, 14 of the first locking means 1. As the guide holes 18b, 18c, 18d of the guide plate 18 are moved relative to the induction pins 12c, 13c, 14c of the locking gears 12, 13, 14 of the first locking means 1, the locking gears 12, 13, 14 are turned about the supporting pins 10e, 10f, 10g and displaced so as to be disengaged from the circumferential toothed surface 11b of the cover plate 11 of the first locking means 1 as shown in FIG. 9. As a result, the cover plate 11 of the first locking means 1 which is mounted to the first side frame portion 2a of the seat back frame 2 is released from the housing 10 of the first locking means 1 which is mounted to the first side bracket 3a of the seat cushion frame. Similarly, when the rotational torque is transmitted to the actuating shaft 16' of the second locking means 1' through the supporting shaft 4, the cam 15 mounted to the actuating shaft 16' is rotated against the actions of the spiral springs 17a, 17b, 17c of the second locking means 1' and the guide plate 18 of the second locking means 1' is rotated together with the cam 15 of the actuating shaft 16'. At this time, the guide holes 18b, 18c, 18d of the guide plate 18 of the second locking means 1' are moved relative to the induction pins 12c, 13c, 14c of the locking gears 12, 13, 14 of the second locking means 1'. As the guide holes 18b, 18c, 18d of the guide plate 18 of the second locking means 1' are moved relative to the induction pins 12c, 13c, 14c of the locking gears 12, 13, 14 of the second locking means 1', the locking gears 12, 13, 14 of the second locking means 1' are turned about supporting pins 10e, 10f, 10g of the second locking means 1' and displaced so as to be disengaged from a circumferential toothed surface 11b of the cover plate 11 of the second locking means 1'. As a result, the cover plate 11 of the second locking means 1' which is mounted to the second side frame portion 2b of the seat back frame 2 is released from the housing 10 of the second locking means 1' which is mounted to the second side bracket 3b of the seat cushion frame. In a condition where the cover plates 11 of the first and second locking means 1, 1' are released from the housings 10 as discussed above, the passenger can cause the seat back to be reclined relative to the seat cushion.

When the operating lever 5 is released from the passenger after the seat back is reclined relative to the seat cushion at a desired angle, the cam 15 of the first locking means 1 is turned together with the guide plate 18 of the first locking means 1 due to the actions of the spiral springs 17a–17c of the first locking means 1, whereby the locking gears 12–14 of the first locking means 1 are turned around the supporting shafts 10e–10g of the first locking means 1 and pushed against the toothed surface 11b of the cover plate 11 of the first locking means. As a result, the toothed portions 12b, 13b, 14b of the locking gears 12–14 of the first locking means 1 are normally and securely meshed with the toothed surface 11b of the cover plate 11 as shown in FIG. 8. The actuating shaft 16' and the supporting shaft 4 are connected to each other in such a manner to be capable of rotating relative to each other as described above, so that independently from a rotational torque which is transmitted through the cam 15 and actuating shaft 16 of the first locking means 1 to the supporting shaft 4, the cam 15 of the second locking means 1' is turned together with the guide plate 18 of the second locking means 1' due to the actions of the spiral springs 17a–17c of the second locking means 1', whereby the locking gears 12–14 of the second locking means 1' are turned around the supporting shafts 10e–10g of the second locking means 1' and pushed against the toothed surface 11b of the cover plate 11 of the second locking means 1'. As a result, the toothed portions 12b, 13b, 14b of the locking gears 12–14 of the second locking means 1' are normally and securely meshed with the toothed surface 11b of the cover plate 11 of the second locking means 1'. Thus, the seat back can be stably secured relative to the seat cushion in a desired posture.

As discussed above, the actuating shaft 16 of the first locking means 1 is rigidly or fixedly connected to the supporting shaft 4, whereas the actuating shaft 16' of the second locking means 1' is coupled to the supporting shaft 4 in such a manner to be able to be rotated relative to the supporting shaft 4 by a predetermined angle. Therefore, when the cam 15 of the first locking means which is mounted to the actuating shaft 16 of the first locking means 1 for rotation therewith is turned due to the actions of the spiral springs 17a–17c of the first locking means 1, the cam 15 of the second locking means 1' which is mounted to the actuating shaft 16' coupled to the supporting shaft 4 so as to be rotatable relative to the supporting shaft 4 can be turned to due to the actions of the spiral springs 17a–17c of the second locking means 1', independently from the turning of the cam 15 of the first locking means 1, so that the toothed portions 12b, 13b, 14b of the locking gears 12–14 of the second locking means 1' can be normally and securely meshed with the toothed surface 11b of the cover plate 11 of the second locking means 1'.

In the illustrated example, a plurality of the locking gears 12–14 are adapted to be engaged with the toothed surface 11b of the cover plate 11 from a radial direction, so that the seat back can be steadily secured relative to the seat cushion.

Figure 15:
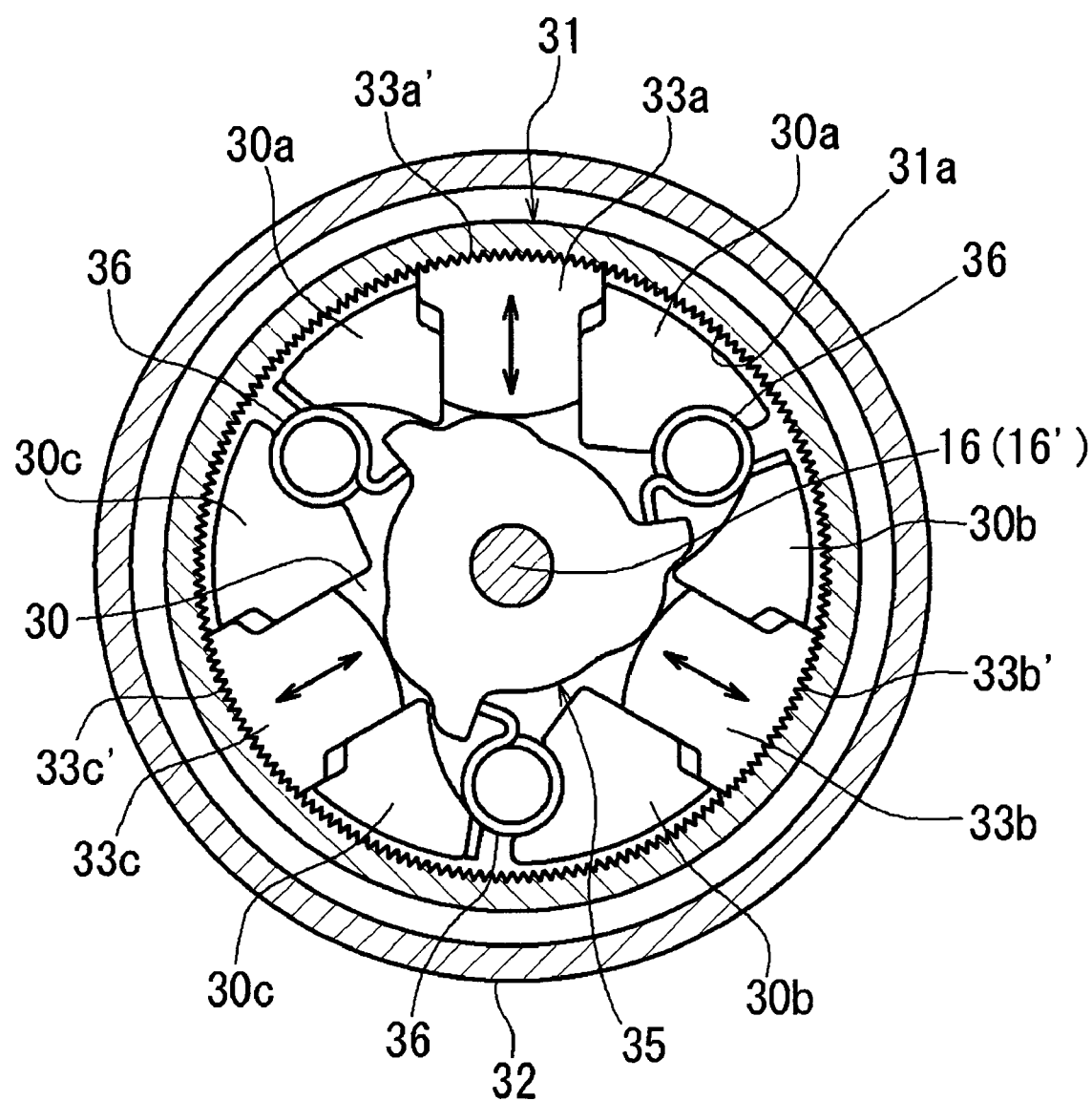
FIG. 15 is a schematic side view of locking means which may be employed in lieu of each of the first and second locking means of FIGS. 3 and 10.
Figure 16:
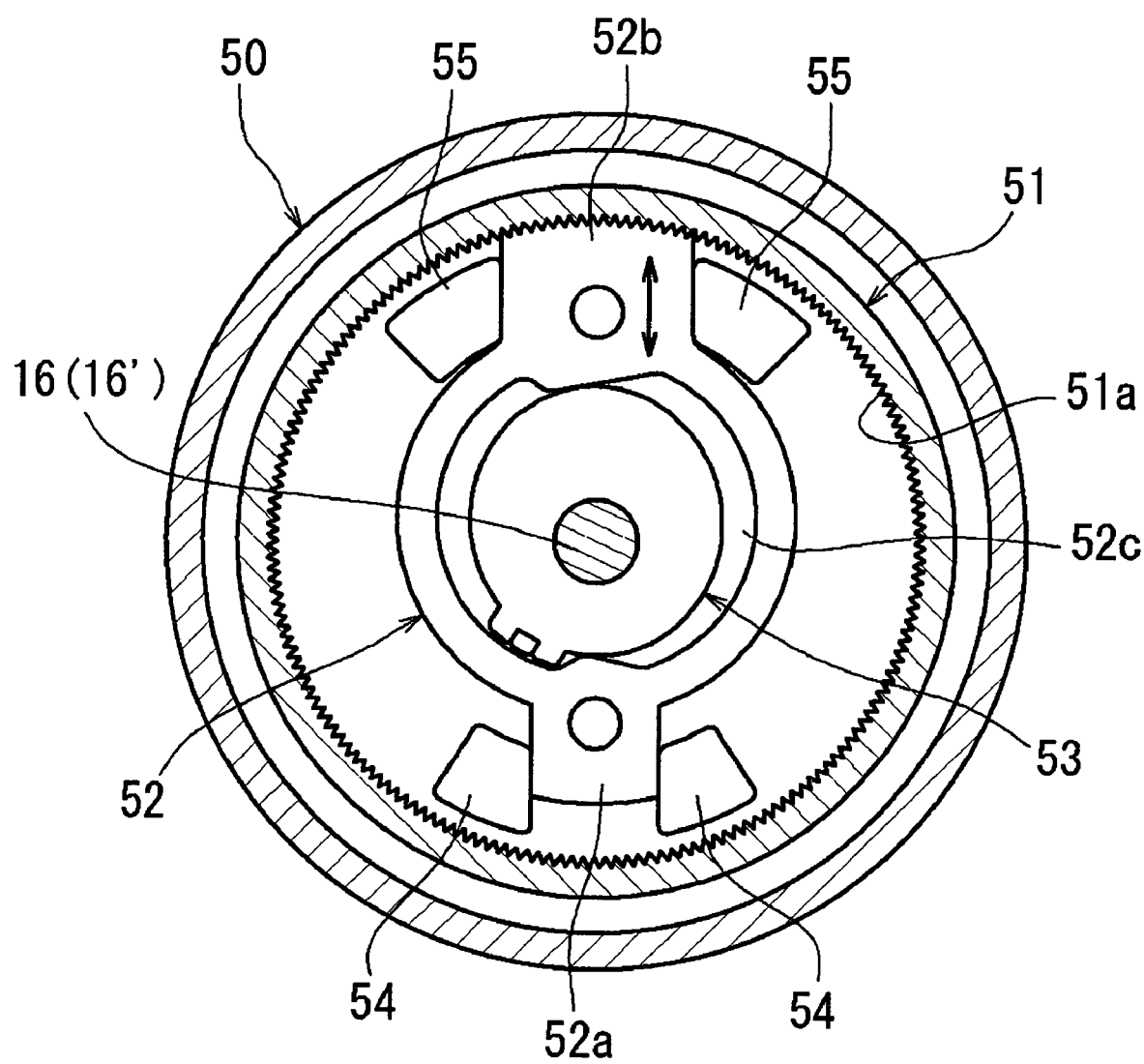
FIG. 16 is a schematic side view of another locking means which may be employed in lieu of each of the first and second locking means of FIGS. 3 and 10, and in which the locking means includes only one locking gear.
Figure 17:
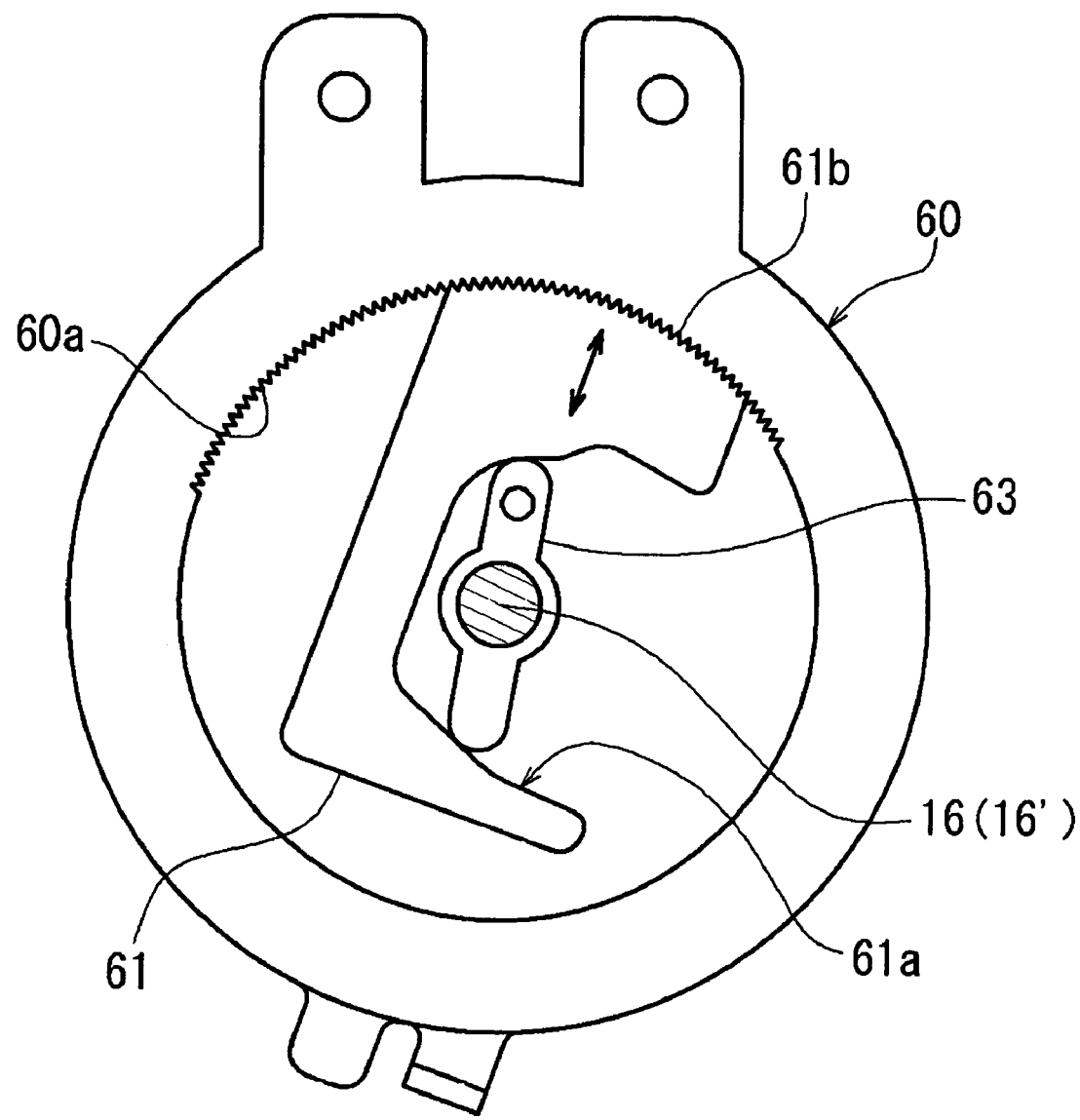
FIG. 17 is a schematic side view of still another locking means which may be employed in lieu of each of the first and second locking means.

In lieu of each of the first and second locking means 1, 1' shown in FIGS. 3 and 10, any suitable locking means may be employed. For example, such locking means as shown in FIGS. 15–17 may be employed. In each of the illustrated examples, an actuating shaft is constructed in the same manner as the actuating shaft 16 of FIG. 3 or the actuating shaft 16' of FIG. 10 is done, and denoted by same reference numeral in FIGS. 15–17.

Referring to FIG. 15, there is illustrated a conventional locking means which may be employed in the seat according to the present invention. The conventional locking means is disclosed in Japanese Patent Application Laid-Open No. 8-253063. The locking means generally includes a stationary housing 30 formed integrally with a frame for a seat cushion, the stationary housing 30 having three pairs of spaced apart bosses 30a, 30b, 30c, a movable cover plate 31 formed integrally with a seat back, the movable cover plate 31 having a circumferentially toothed portion 31a, a ring 32 for holding the stationary housing 30 and the movable cover plate 31, three locking gears 33a, 33b, 33c arranged between the first spaced apart bosses 30a, between the second spaced apart bosses 30b, and between the third spaced apart bosses 30c, respectively, so as to be slidable in a radial direction, the first, second and third locking gears 33a, 33b 33c having a toothed portion 33a', a toothed portion 33b', and toothed portion 33c', respectively, an actuating shaft 16 (16'), a cam 35 for pushing the locking gears 33a, 33b, 33c in such a manner that the toothed portions 33a', 33b', 33c' of the locking gears 33a, 33b, 33c are meshed with the circumferentially toothed portion 31a of the movable cover plate 31, the cam 35 being mounted to the actuating shaft 16 (16') for rotation therewith, and three springs 36 for urging the cam 35.

In the locking means shown in FIG. 15, when the cam 35 is turned against the actions of the springs 36, the locking gears 33a, 33b, 33c are moved away from the circumferentially toothed surface 31a of the movable cover plate 31, whereby the toothed portions 33a', 33b', 33c' of the locking gears 33a, 33b, 33c are disengaged from the circumferentially toothed portion 31a of the movable flange 31. In this condition, the seat back is allowed to be reclined relative to the seat cushion.

Referring to FIG. 16, there is illustrated another conventional locking means which may be employed in the seat according to the present invention. In the illustrated example, only one locking gear 52 is employed. The locking means is disclosed in U.S. Pat. No. 4,103,970. The locking means includes a housing 50, a cover plate 51 having inwardly extending locking teeth 51a, a plate-shaped locking gear 52 having a first end 52a and a second toothed end 52b that is cooperable with the locking teeth 51a of the cover plate 51 to selectively prevent pivotal movement between the seat cushion and seat back, an actuating cam 53 received within an opening 52c of the locking gear 52 for moving the locking gear 52, an actuating shaft 16 (16') supporting the actuating cam 53, a first pair of spaced apart guides 54 slidably supporting the first gear end 52a, and a second pair of spaced apart guides 55 slidably supporting the second toothed gear end 52b for movement toward and away from the locking teeth 51a of the cover plate 51.

In the locking means shown in FIG. 16, when the actuating cam 53 is rotated, the locking gear 52 is moved in such a manner to cause the toothed gear end 52b to be moved away from the locking teeth 51a of the cover plate 51, whereby the toothed gear end 52b is disengaged from the locking teeth 51a of the cover plate 51. In this condition, the seat back is allowed to be reclined relative to the seat cushion.

Referring to FIG. 17, there is illustrated still another conventional locking means which may employed in the seat according to the present invention. The conventional locking means is disclosed in Japanese Patent Application Laid-Open No. 10-127398. The conventional locking means includes a cover plate 60 having inwardly extending locking teeth 60a, a locking gear 61 having a cam groove 61a and a toothed portion 61b that is coopertable with the inwardly extending locking teeth 60a of the cover plate 60, an actuating shaft 16 (16'), and a cam 63 arranged within the cam groove 61a of the locking gear 61 and supported to the shaft 16 (16').

In the locking means shown in FIG. 17, when the cam 63 is rotated while being slid along the cam groove 61a of the locking gear 61, the locking gear 61 is moved away from the inwardly extending locking teeth 60a of the cover plate 60, whereby the toothed portion 61b of the locking gear 61 is disengaged from the inwardly extending locking teeth 60a of the cover plate 60. In this condition, the seat back is allowed to be reclined relative to the seat cushion.

Japanese Patent Application Laid-Open No. 8-253063, U.S. Pat. No. 4,103,970 and Japanese Patent Application Laid-Open No. 10-127398 are incorporated herein as references.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A reclining seat comprising:
   a seat cushion;
   a seat back pivotally mounted to said seat cushion;
   first and second locking means arranged at both sides of said seat for securing said seat back relative to said seat cushion; and
   a supporting shaft interconnecting said first and second locking means;
   said supporting shaft being formed into a substantially cylindrical shape and having first and second end portions;
   said second end portion of said supporting shaft being formed into a substantially elliptical shape in cross-section and comprising a pair of flat wall sections spaced apart from each other and a pair of circular arc-shaped wall sections spaced apart from each other and interconnecting said flat wall sections;
   said first locking means including a first actuating shaft for facilitating selective securing of said seat back relative to said seat cushion;
   said second locking means including a second actuating shaft for facilitating selective securing of said seat back relative to said seat cushion;
   said first actuating shaft being rigidly or fixedly connected to said first end portion of said supporting shaft;
   said second actuating shaft having first and second end portions;
   said first end portion of said second actuating shaft having an axial portion and a pair of flange portions spaced apart from each other and protruding radially from said axial portion; and
   said first end portion of said second actuating shaft being received in said second end portion of said supporting shaft so that said second actuating shaft and said supporting shaft are rotatable by a predetermined angle relative to each other.

2. A reclining seat as defined in claim 1, wherein said first end portion of said second actuating shaft has a round bar-shaped body, said first end portion of said second actuating shaft being received in said second end portion of said supporting shaft so that said round bar-shaped body and said spaced apart flat wall sections of said supporting shaft are slid relative to each other and said flange portions and said spaced apart circular arc-shaped wall sections are slid relative to each other, when one of said supporting shaft and said second actuating shaft is rotated relative to the other of said supporting shaft and said second actuating shaft.

3. A reclining seat as defined in claim 2, wherein said second end portion of said supporting shaft further includes corner portions between said flat wall sections and said circular arc-shaped wall sections, said flange portions of said second actuating shaft and said corner portions of said supporting shaft being adapted to be engaged with each other when one of said supporting shaft and said second actuating shaft is rotated relative to the other of said supporting shaft and said second actuating shaft.

4. A reclining seat as defined in claim 3, wherein said first locking means comprises:
   a first disk-shaped housing mounted to a seat cushion frame for said seat cushion;
   a first disk-shaped cover plate received in said first housing in a face to face relation so as to be rotatable relative to said first housing, and mounted to a seat back frame for said seat back;
   first locking gear means arranged within an inner surface of said first housing between said first housing and said first cover plate;
   said first locking gear means being movable between a first locked position and a first unlocked position;
   first cooperating means on said first disk-shaped cover plate and said first locking gear means for securing said seat back relative to said seat cushion in said first locked position; and
   a first cam for causing said first locking gear means to be moved between said first locked position and said first unlocked position;
   said first cam being mounted to said first actuating shaft for rotation therewith; and
   said first cam being arranged within said first housing with said first actuating shaft of said first cam extending through said first housing and said first cover plate; and
   said second locking means comprises:
   a second disk-shaped housing mounted to said seat cushion frame for said seat cushion;
   a second disk-shaped cover plate received in said second housing in a face to face relation so as to be rotatable relative to said second housing, and mounted to said seat back frame for said seat back;
   second locking gear means arranged within an inner surface of said second housing between said second housing and said second cover plate;
   said second locking gear means being movable between a second locked position and a second unlocked position;
   second cooperating means on said second disk-shaped cover plate and said second locking gear means for securing said seat back relative to said seat cushion in said second locked position; and
   a second cam for causing said second locking gear means to be moved between said second locked position and said second unlocked position;

said second cam being mounted to said second actuating shaft for rotation therewith; and said second cam being arranged within said second housing with said second actuating shaft of said second cam extending through said second housing and said second cover plate.

5. A reclining seat as defined in claim 4, wherein said first locking gear means comprises a plurality of first locking gears, said first cooperating means comprises a circumferentially toothed surface formed around an inner periphery of said first cover plate and a toothed surface formed on each of said first locking gears, said first locking gears being radially arranged within said first housing and surrounding said first cam, said second locking gear means comprises a plurality of second locking gears, and said second cooperating means comprises a circumferentially toothed surface formed around an inner periphery of said second cover plate and a toothed surface formed on each of said second locking gears, said second locking gears being radially arranged within said second housing and surrounding said second cam.

6. A reclining seat as defined in claim 5, wherein said first actuating shaft has third and fourth end portions, said third end portion of said first actuating shaft being rigidly or fixedly connected to said first end portion of said supporting shaft, and wherein said seat further includes an operating lever which is mounted to said fourth end portion of said first actuating shaft.

7. A reclining seat as defined in claim 4, wherein said first actuating shaft has third and fourth end portions, said third end portion of said first actuating shaft being rigidly or fixedly connected to said first end portion of said supporting shaft, and wherein said seat further includes an operating lever which is mounted to said fourth end portion of said first actuating shaft.

8. A reclining seat as defined in claim 3, wherein said first actuating shaft has third and fourth end portions, said third end portion of said first actuating shaft being rigidly or fixedly connected to said first end portion of said supporting shaft, and wherein said seat further includes an operating lever which is mounted to said fourth end portion of said first actuating shaft.

9. A reclining seat as defined in claim 2, wherein said first locking means comprises:
a first disk-shaped housing mounted to a seat cushion frame for said seat cushion;
a first disk-shaped cover plate received in said first housing in a face to face relation so as to be rotatable relative to said first housing, and mounted to a seat back frame for said seat back;
first locking gear means arranged within an inner surface of said first housing between said first housing and said first cover plate;
said first locking gear means being movable between a first locked position and a first unlocked position;
first cooperating means on said first disk-shaped cover plate and said first locking gear means for securing said seat back relative to said seat cushion in said first locked position; and
a first cam for causing said first locking gear means to be moved between said first locked position and said first unlocked position;
said first cam being mounted to said first actuating shaft for rotation therewith; and
said first cam being arranged within said first housing with said first actuating shaft of said first cam extending through said first housing and said first cover plate; and said second locking means comprises:
a second disk-shaped housing mounted to said seat cushion frame for said seat cushion;
a second disk-shaped cover plate received in said second housing in a face to face relation so as to be rotatable relative to said second housing, and mounted to said seat back frame for said seat back;
second locking gear means arranged within an inner surface of said second housing between said second housing and said second cover plate;
said second locking gear means being movable between a second locked position and a second unlocked position;
second cooperating means on said second disk-shaped cover plate and said second locking gear means for securing said seat back relative to said seat cushion in said second locked position; and
a second cam for causing said second locking gear means to be moved between said second locked position and said second unlocked position;
said second cam being mounted to said second actuating shaft for rotation therewith; and
said second cam being arranged within said second housing with said second actuating shaft of said second cam extending through said second housing and said second cover plate.

10. A reclining seat as defined in claim 9, wherein said first locking gear means comprises a plurality of first locking gears, said first cooperating means comprises a circumferentially toothed surface formed around an inner periphery of said first cover plate and a toothed surface formed on each of said first locking gears, said first locking gears being radially arranged within said first housing and surrounding said first cam, said second locking gear means comprises a plurality of second locking gears, and said second cooperating means comprises a circumferentially toothed surface formed around an inner periphery of said second cover plate and a toothed surface formed on each of said second locking gears, said second locking gears being radially arranged within said second housing and surrounding said second cam.

11. A reclining seat as defined in claim 10, wherein said first actuating shaft has third and fourth end portions, said third end portion of said first actuating shaft being rigidly or fixedly connected to said first end portion of said supporting shaft, and wherein said seat further includes an operating lever which is mounted to said fourth end portion of said first actuating shaft.

12. A reclining seat as defined in claim 9, wherein said first actuating shaft has third and fourth end portions, said third end portion of said first actuating shaft being rigidly or fixedly connected to said first end portion of said supporting shaft, and wherein said seat further includes an operating lever which is mounted to said fourth end portion of said first actuating shaft.

13. A reclining seat as defined in claim 2, wherein said first actuating shaft has third and fourth end portions, said third end portion of said first actuating shaft being rigidly or fixedly connected to said first end portion of said supporting shaft, and wherein said seat further includes an operating lever which is mounted to said fourth end portion of said first actuating shaft.

14. A reclining seat as defined in claim 1, wherein said second end portion of said supporting shaft further includes corner portions between said flat wall sections and said circular arc-shaped wall sections, said flange portions of said second actuating shaft and said corner portions of said supporting shaft being adapted to be engaged with each other when one of said supporting shaft and said second actuating shaft is rotated relative to the other of said supporting shaft and said second actuating shaft.

15. A reclining seat as defined in claim 14, wherein said first locking means comprises:
   a first disk-shaped housing mounted to a seat cushion frame for said seat cushion;
   a first disk-shaped cover plate received in said first housing in a face to face relation so as to be rotatable relative to said first housing, and mounted to a seat back frame for said seat back;
   first locking gear means arranged within an inner surface of said first housing between said first housing and said first cover plate;
   said first locking gear means being movable between a first locked position and a first unlocked position;
   first cooperating means on said first disk-shaped cover plate and said first locking gear means for securing said seat back relative to said seat cushion in said first locked position; and
   a first cam for causing said first locking gear means to be moved between said first locked position and said first unlocked position;
   said first cam being mounted to said first actuating shaft for rotation therewith; and
   said first cam being arranged within said first housing with said first actuating shaft of said first cam extending through said first housing and said first cover plate; and
   said second locking means comprises:
   a second disk-shaped housing mounted to said seat cushion frame for said seat cushion;
   a second disk-shaped cover plate received in said second housing in a face to face relation so as to be rotatable relative to said second housing, and mounted to said seat back frame for said seat back;
   second locking gear means arranged within an inner surface of said second housing between said second housing and said second cover plate;
   said second locking gear means being movable between a second locked position and a second unlocked position;
   second cooperating means on said second disk-shaped cover plate and said second locking gear means for securing said seat back relative to said seat cushion in said second locked position; and
   a second cam for causing said second locking gear means to be moved between said second locked position and said second unlocked position;
   said second cam being mounted to said second actuating shaft for rotation therewith; and
   said second cam being arranged within said second housing with said second actuating shaft of said second cam extending through said second housing and said second cover plate.

16. A reclining seat as defined in claim 15, wherein said first locking gear means comprises a plurality of first locking gears, said first cooperating means comprises a circumferentially toothed surface formed around an inner periphery of said first cover plate and a toothed surface formed on each of said first locking gears, said first locking gears being radially arranged within said first housing and surrounding said first cam, said second locking gear means comprises a plurality of second locking gears, and said second cooperating means comprises a circumferentially toothed surface formed around an inner periphery of said second cover plate and a toothed surface formed on each of said second locking gears, said second locking gears being radially arranged within said second housing and surrounding said second cam.

17. A reclining seat as defined in claim 16, wherein said first actuating shaft has third and fourth end portions, said third end portion of said first actuating shaft being rigidly or fixedly connected to said first end portion of said supporting shaft, and wherein said seat further includes an operating lever which is mounted to said fourth end portion of said first actuating shaft.

18. A reclining seat as defined in claim 15, wherein said first actuating shaft has third and fourth end portions, said third end portion of said first actuating shaft being rigidly or fixedly connected to said first end portion of said supporting shaft, and wherein said seat further includes an operating lever which is mounted to said fourth end portion of said first actuating shaft.

19. A reclining seat as defined in claim 14, wherein said first actuating shaft has third and fourth end portions, said third end portion of said first actuating shaft being rigidly or fixedly connected to said first end portion of said supporting shaft, and wherein said seat further includes an operating lever which is mounted to said fourth end portion of said first actuating shaft.

20. A reclining seat as defined in claim 1, wherein said first locking means comprises:
   a first disk-shaped housing mounted to a seat cushion frame for said seat cushion;
   a first disk-shaped cover plate received in said first housing in a face to face relation so as to be rotatable relative to said first housing, and mounted to a seat back frame for said seat back;
   first locking gear means arranged within an inner surface of said first housing between said first housing and said first cover plate;
   said first locking gear means being movable between a first locked position and a first unlocked position;
   first cooperating means on said first disk-shaped cover plate and said first locking gear means for securing said seat back relative to said seat cushion in said first locked position; and
   a first cam for causing said first locking gear means to be moved between said first locked position and said first unlocked position;
   said first cam being mounted to said first actuating shaft for rotation therewith; and
   said first cam being arranged within said first housing with said first actuating shaft of said first cam extending through said first housing and said first cover plate; and
   said second locking means comprises:
   a second disk-shaped housing mounted to said seat cushion frame for said seat cushion;
   a second disk-shaped cover plate received in said second housing in a face to face relation so as to be rotatable relative to said second housing, and mounted to said seat back frame for said seat back;
   second locking gear means arranged within an inner surface of said second housing between said second housing and said second cover plate;
   said second locking gear means being movable between a second locked position and a second unlocked position;
   second cooperating means on said second disk-shaped cover plate and said second locking gear means for securing said seat back relative to said seat cushion in said second locked position; and a second cam for causing said second locking gear means to be moved between said second locked position and said second unlocked position;

said second cam being mounted to said second actuating shaft for rotation therewith; and said second cam being arranged within said second housing with said second actuating shaft of said second cam extending through said second housing and said second cover plate.

21. A reclining seat as defined in claim 20, wherein said first locking gear means comprises a plurality of first locking gears, said first cooperating means comprises a circumferentially toothed surface formed around an inner periphery of said first cover plate and a toothed surface formed on each of said first locking gears, said first locking gears being radially arranged within said first housing and surrounding said first cam, said second locking gear means comprises a plurality of second locking gears, and said second cooperating means comprises a circumferentially toothed surface formed around an inner periphery of said second cover plate and a toothed surface formed on each of said second locking gears, said second locking gears being radially arranged within said second housing and surrounding said second cam.

22. A reclining seat as defined in claim 21, wherein said first actuating shaft has third and fourth end portions, said third end portion of said first actuating shaft being rigidly or fixedly connected to said first end portion of said supporting shaft, and wherein said seat further includes an operating lever which is mounted to said fourth end portion of said first actuating shaft.

23. A reclining seat as defined in claim 20, wherein said first actuating shaft has third and fourth end portions, said third end portion of said first actuating shaft being rigidly or fixedly connected to said first end portion of said supporting shaft, and wherein said seat further includes an operating lever which is mounted to said fourth end portion of said first actuating shaft.

24. A reclining seat as defined in claim 1, wherein said first actuating shaft has third and fourth end portions, said third end portion of said first actuating shaft being rigidly or fixedly connected to said first end portion of said supporting shaft, and wherein said seat further includes an operating lever which is mounted to said fourth end portion of said first actuating shaft.

* * * * *